C. H. SMOOT.
SLAG STEAM GENERATOR.
APPLICATION FILED MAY 1, 1914.
1,121,946. Patented Dec. 22, 1914.
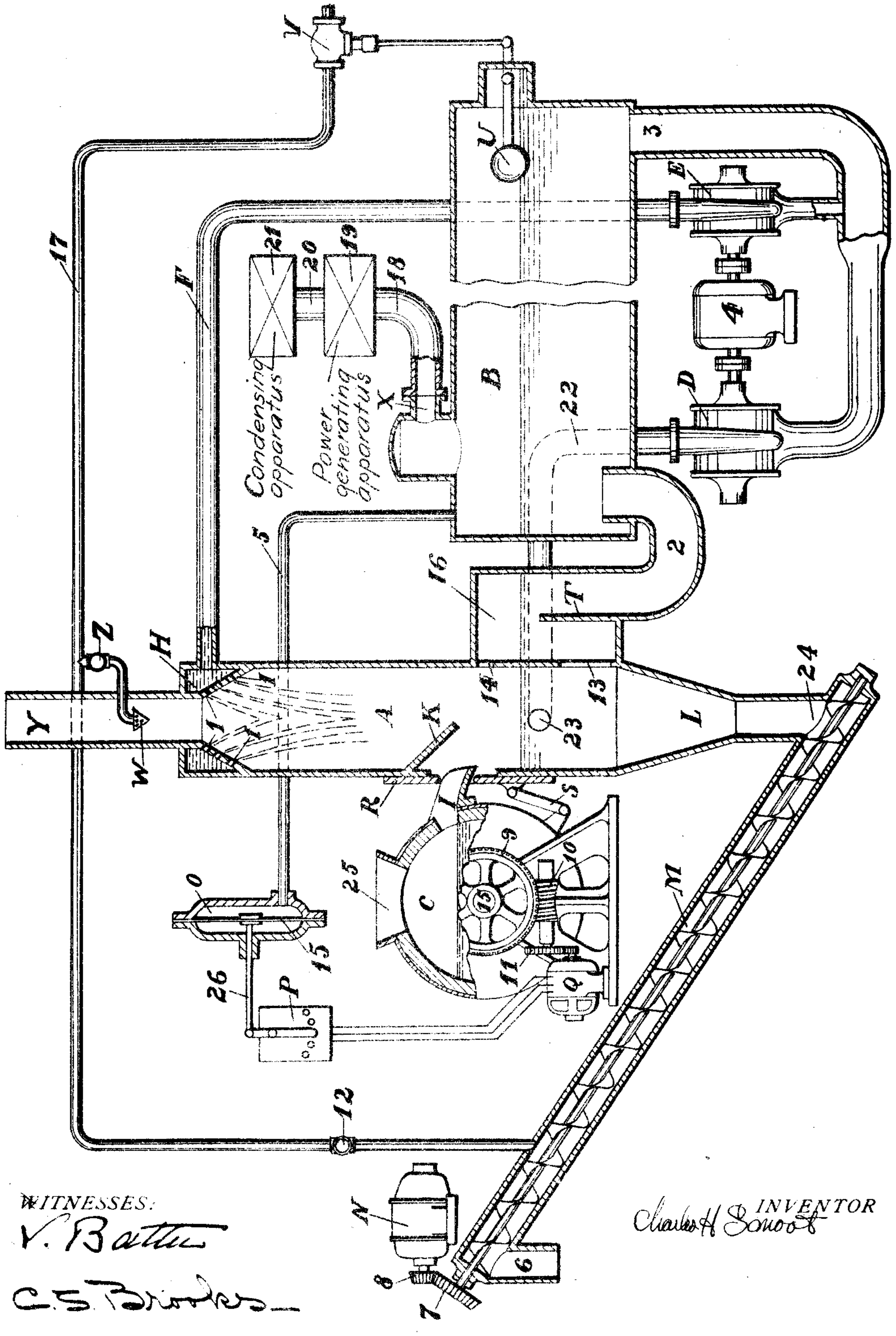
WITNESSES:
V. Batten
C. S. Brooks
Charles H. Smoot INVENTOR

UNITED STATES PATENT OFFICE.

CHARLES H. SMOOT, OF NEW YORK, N. Y., ASSIGNOR TO SLAG STEAM GENERATOR COMPANY, OF NEW YORK, N. Y., A CORPORATION OF DELAWARE.

SLAG STEAM-GENERATOR.

1,121,946. Specification of Letters Patent. Patented Dec. 22, 1914.

Application filed May 1, 1914. Serial No. 835,597.

*To all whom it may concern:*

Be it known that I, CHARLES H. SMOOT, a citizen of the United States, whose post-office address is 90 West street, New York city and State, have invented certain new and useful Improvements in Slag Steam-Generators, which improvements are fully set forth in the following specification.

This invention has for its object means by which slag or any pre-heated material, such as metal poured out of a furnace, can be employed to heat a liquid, which liquid, after having absorbed heat previously contained in the slag, is evaporated, the evaporation being due to a reduction of pressure on the liquid.

By means of my invention a power generating apparatus interposed between the apparatus where evaporation takes place and a condensing apparatus is supplied with motive fluid. The steam generated by the heat contained in the slag and transferred to the liquid can be used for a different purpose than to generate power, such as heating, for instance. I therefore do not wish to be limited to the specific use which can be made of the steam generated by the use of the apparatus disclosed in these specifications.

The accompanying drawing is a vertical cross section of an embodiment of my invention.

C is a reservoir for slag.

I is a discharge nozzle for reservoir C. Slag reservoir C rotates around axis 15 by means of gears 9, 10 and 11, operated by electrical motor Q.

A is a chamber containing water into which the slag contained in reservoir C is discharged through nozzle I.

R is a shield operated by link S connected to reservoir C. Shield R moves up and down in the same ratio and as reservoir C rotates around its axis 15, in a clockwise or counter-clockwise direction.

K is a stationary shield which can be placed in chamber A, in order to prevent the slag discharged in chamber A from entering into direct contact with the water which is made to fall in streams in said chamber.

16 is a chamber adjacent to chamber A and communicates with same through passages 13 under the water level and 14 above the water level of chamber A.

T is a dividing partition in chamber 16 which communicates on one side of said partition with evaporating chamber B through siphon 2.

U is a float operating valve V in such a way that when the level in evaporating chamber B falls under a predetermined point, additional make up water is supplied in my apparatus from any suitable source of water supply. This make up water is introduced through pipe 17 in chamber A by means of spray nozzle W or in conveyer M, both inlets being controlled by hand valves Z and 12.

X is the point of discharge in evaporating tank B, which allows the steam generated to flow through pipe 18 into power generating apparatus 19, which power generating apparatus is connected by pipe 20 to condensing apparatus 21.

3 is a channel leading the water contained in evaporating tank B into pumps D and E, which are operated by electric motor 4. Pump E, through pipe F, discharges the water above the level of the water contained in chamber A. Circular duct H, through perforations 1, 1, 1, allows the water to fall in sprays into chamber A.

Y is a duct giving free passage to gases and vapors which escape from chamber A. Pipe 22 discharges the water pumped by pump D into chamber A through opening 23.

L is a portion of chamber A located under the water level, which allows the solidified slag to fall through opening 24 into conveyer M, 6 being the discharge opening of the conveyer, 7 and 8 the gears which operate the conveyer, which gears are operated by electric motor N.

5 is a pipe which allows the steam pressure in evaporating chamber B to act upon diaphragm 15 contained in chamber O, which diaphragm operates, through rod 26, electric controller P. Electric controller P operates motor Q, which controls the motion of slag reservoir C.

25 is an opening in reservoir C, through which slag is poured into same.

Having thus described the various parts of one embodiment of my invention, I will describe the method of operation of same. Slag, or any other heat-containing material in liquid or solid form, is introduced into chamber A. In certain instances it is desirable that the heat-containing material thus introduced into chamber A be subjected to a cooling influence before it enters the body of water [illegible] in chamber A, in which case [illegible] heat-containing [illegible] into chamber A [illegible] with the water sprays falling from [illegible] of chamber A [illegible] do not wish to be limited [illegible] from which the slag or heat-containing bodies introduced into chamber A [illegible] drop into the water contained in chamber A. In a specific instance it may be [illegible] to have as small a drop as possible, substantially none, and in another instance it may be desirable to allow the slag or heat containing bodies to fall [illegible] height through the steam and water sprays before immersion in the body of water contained in chamber A. The slag or other heat containing bodies fall through the water in the lower portion [illegible] of chamber A and are taken out by conveyor M. Obviously, the conveyor M [illegible] type, and I do not wish to [illegible] type shown in the [illegible] ing. When the [illegible] heat containing bodies [illegible] in chamber A [illegible] tion of steam in chamber A [illegible] rates this steam [illegible] portion of chamber A [illegible] discharged through [illegible]. The gases which [illegible] erated in chamber A [illegible] tage to escape through [illegible] [illegible]

[illegible] from chamber [illegible]. It is necessary that a [illegible] circulation of water [illegible] that all the heat [illegible] other [illegible] ferred by the water [illegible] ber B. It may be [illegible] D discharge [illegible] water level of chamber [illegible] discharge [illegible] thus requiring [illegible] per gallon of water in circulation in the latter case. Enough water should be lifted by pump [illegible] to properly absorb the heat contained in the steam, which has a tendency to rise in chamber A and escape through duct Y, and also to perform any other cooling duty necessary, the balance of the cooling water being handled by pump D. The water contained in chambers B and A will continuously diminish in quantity as steam is discharged by opening X. Make up water must therefore be supplied from any suitable source. Any desired amount of make up water can be discharged to the equipment by spraying device W and part can also be discharged into conveyer M. The regulation of the amounts thus discharged can be regulated by valves Z and 12. The make up water discharged into conveyer M absorbs the heat still contained in the solid matter conveyed and goes into chamber A through opening 24 at a temperature which can be in the neighborhood of [illegible]. If the power generating apparatus [illegible] does not require the amount of [illegible] being generated at a given time, the [illegible] will build up in evaporating tank [illegible]. The increase or decrease of pressure [illegible] one side of diaphragm 15 and [illegible] operate the electric controller P. The electric controller P, through standard well known methods of contacts, can operate the [illegible] in one direction or in the [illegible] and reservoir C will tilt more or less in a clockwise or counter-clockwise direction; in other words, will pour more or less slag or other heat containing material stored [illegible].

In the embodiment of my invention shown in the accompanying drawing, I have shown a reservoir C, in which slag or other heat containing material can be stored in sufficient [illegible] to insure continuity in the [illegible] of steam generation. It may happen, for instance, that slag discharged by one or more furnaces can be discharged [illegible] into chamber A. In this case, to [illegible] my invention it would be useless to [illegible] reservoir C.

The accompanying drawing shows means [illegible] adapted for slag. Changes, obvious to one skilled in the art, would have to be made in order to pass, for instance, hot [illegible] or solid heat containing bodies through the water in chamber A.

If slow cooling is desired, it may be necessary to introduce the heat containing materials at a higher point in chamber A, in such a way that the sprays of water discharged by openings 1, 1, 1 come in contact with the heat containing materials and cool them somewhat before they enter the body of water contained in chamber A.

In the accompanying drawing I have shown diagrammatically a power generating apparatus 19. This apparatus can be, very advantageouslv, a steam turbine, which apparatus is a verv efficient thermic engine when dealing with low pressures especially. The condensing apparatus 21 can be a condenser of any standard type. Pipe 18 can discharge the steam generated in chamber B into a heating device, or any other heat absorbing device.

Having thus described my invention, what I claim is:

1. In an apparatus for producing steam by means of direct contact of a liquid at lower temperature and heat containing bodies at a higher temperature, a chamber for mixing the liquid and the heat containing bodies, an evaporating chamber, means affording passage to the liquid from the mixing chamber into the evaporating chamber, means affording passage to the liquid from the evaporating chamber into the mixing chamber, pumping means to circulate the liquid from one chamber to the other and means to cool the liquid in the evaporating chamber.

2. In an apparatus for producing steam by means of direct contact of a liquid at a lower temperature and heat containing bodies at higher temperature, a chamber having a duct open to atmosphere for mixing the liquid and the heat containing bodies, an evaporating chamber, means affording passage to the liquid from the mixing chamber into the evaporating chamber, means affording passage to the liquid from the evaporating chamber into the mixing chamber, pumping means to circulate the liquid from one chamber to the other and means to cool the liquid in the evaporating chamber.

3. In an apparatus for producing steam by means of direct contact of a liquid at a lower temperature and heat containing bodies at higher temperature, a chamber for mixing the liquid and the heat containing bodies, an evaporating chamber, pumping means to circulate the liquid above the level of the body of liquid contained in the mixing chamber and means to circulate the liquid of the mixing chamber into the evaporating chamber.

4. In an apparatus for producing steam by means of direct contact of a liquid at lower temperature and heat containing bodies at higher temperature, a chamber for mixing the liquid and the heat retaining bodies, an evaporating chamber, means to circulate the liquid from the mixing chamber into the evaporating chamber and means to prevent the liquid from flowing into the evaporating chamber when the liquid level in the mixing chamber reaches a predetermined minimum level.

5. In an apparatus for producing steam by means of direct contact of a liquid at lower temperature and heat containing bodies at higher temperature, a chamber for mixing the liquid and the heat containing bodies, an evaporating chamber, means to circulate the liquid from one chamber to the other and means to introduce additional liquid to replace the evaporated liquid.

6. In an apparatus for producing steam by means of direct contact of a liquid at lower temperature and heat containing bodies at higher temperature, a chamber, having an open duct or orifice, for mixing the liquid and the heat containing bodies, an evaporating chamber, means to circulate the liquid from one chamber to the other and means to introduce additional liquid to replace the evaporated liquid.

7. In an apparatus for producing steam by means of direct contact of a liquid at lower temperature and heat containing bodies at higher temperature, a chamber, having an open duct or orifice, for mixing the liquid and the heat containing bodies, an evaporating chamber, means to circulate the liquid from one chamber to the other and means to automatically introduce additional liquid to replace the evaporated liquid.

8. In an apparatus for producing steam by means of direct contact of a liquid at lower temperature and heat containing bodies at higher temperature, a mixing chamber for the liquid and heat retaining bodies, an evaporating chamber, means to circulate the liquid from one chamber to the other and a conveyer for extraction of the heat containing bodies after they have been immersed in the liquid contained in the mixing chamber.

9. In an apparatus for producing steam by means of direct contact of a liquid at lower temperature and heat containing bodies at higher temperature, a mixing chamber for the liquid and the heat containing bodies, an evaporating chamber and a storing chamber for the storage of the heat containing bodies, controlled as to the amount of discharge of said bodies into the mixing chamber by the pressure of the steam in the evaporating chamber.

10. In an apparatus for producing steam by means of direct contact of a liquid at lower temperature and heat containing bodies at higher temperature, a mixing chamber for the liquid and the heat containing bodies and means to discharge the additional make up water in said mixing chamber above the water level of the liquid contained in the mixing chamber.

11. In an apparatus for producing steam by means of direct contact of a liquid at lower temperature and heat containing bodies at higher temperature, a mixing chamber for the liquid and the heat containing bodies containing a body of the liquid for immersion of the heat containing bodies and a portion located above the liquid level equipped with a liquid spraying device and an opening affording passage to the heat containing bodies first through the liquid spray, second through the body of liquid.

12. In an apparatus for generating steam by direct contact between a liquid at low temperature and heat containing bodies at higher temperature, a first chamber containing a body of heat absorbing liquid, a second chamber for utilizing by evaporation the heat absorbed by the liquid in the first chamber and means to circulate the liquid from the first chamber to the second chamber and from the second chamber to the first chamber under or at the normal level of the liquid in said first chamber.

13. In an apparatus for generating steam by direct contact between a liquid at a lower temperature and heat containing bodies at a higher temperature, a first chamber containing the heat absorbing liquid, a second chamber to cool the liquid after it has absorbed heat, means to circulate the liquid from one chamber to the other, a source of additional liquid and means to supply said additional liquid into the heat absorbing liquid contained in the first chamber and evaporating means for subjecting the mixture of liquid and additional liquid to a fall in pressure in the second chamber.

14. In an apparatus for generating steam by direct contact between a liquid at a lower temperature and heat containing bodies at a higher temperature, a first chamber for mixing the liquid and the heat containing bodies, means to liberate the gases contained or generated in or during said mixture and a second chamber in which the liquid heated in the first chamber is circulated and subjected to a fall in pressure.

15. In an apparatus for producing steam by means of direct contact of a liquid at lower temperature and heat containing bodies at higher temperature, first, a mixing chamber for the liquid and heat containing bodies, second, an additional partitioned chamber having an opening affording a passage into the mixing chamber at a point well under the liquid in the mixing chamber and a second opening affording passage into the mixing chamber above the water level in same, third, an evaporating chamber and means to circulate the liquid from the first to the second and third chamber in succession when the liquid level in the first two chambers reaches the top of the partition contained in the second chamber.

16. In an apparatus for generation of steam by means of direct contact of a liquid at lower temperature and heat containing bodies at higher temperature, the combination of a reservoir containing liquid, means for introducing the heat containing bodies into the liquid therein, and means for the escape of the gases contained or generated in or during the mixture of liquid and heat containing bodies from the steam thus generated.

17. In an apparatus for the generation of steam by means of direct contact of a liquid at lower temperature and heat containing bodies at higher temperature, the combination of a reservoir containing liquid, means for introducing the heat containing bodies into the liquid therein, means for condensing the steam generated thereby so as to release any gases which have been associated therewith, and an outlet for the escape of such gases.

18. In an apparatus for the generation of steam by the introduction of heated bodies into water, the combination of a reservoir containing liquid, means for introducing the heated bodies into the liquid therein, an evaporator and a seal through which the water can flow from said reservoir into said evaporator.

19. In an apparatus for the generation of steam by the introduction of heated bodies into liquid, the combination of a reservoir containing liquid, means for introducing the heated bodies into the liquid therein, an evaporator and a seal through which the liquid can flow from said reservoir into said evaporator, and means for returning liquid from the evaporator to the reservoir again.

20. In an apparatus for the generation of steam by the introduction of heated bodies into liquid, a combination of a reservoir containing liquid, means for introducing the heated bodies into the liquid therein, an evaporator, a seal through which the liquid can flow from said reservoir into said evaporator, and means for returning liquid from the evaporator to the reservoir in the form of a spray falling into said reservoir from above the liquid level therein.

21. In an apparatus for the generation of steam by the introduction of heated bodies into liquid, the combination of a reservoir containing liquid, means for introducing the heated bodies into the liquid therein, and automatic means responsive to the pressure of the steam generated for regulating the delivery of the heated bodies.

In witness whereof, I hereunto subscribe my name this 29th day of April, 1914.

CHARLES H. SMOOT.

Witnesses:
L. L. Battes,
Alfred E. Smith.